United States Patent [19]
Codazzi et al.

[11] Patent Number: 5,746,195
[45] Date of Patent: May 5, 1998

[54] FLOW TURBULENCE CREATING ARRANGEMENT OF A GAS-FIRED DEEP FAT FRYER

[75] Inventors: Luca Codazzi, Mestre; Mauro Moro, Pordenone, both of Italy

[73] Assignee: Electrolux Zanussi Grandi Impianti S.P.A., Pordenone, Italy

[21] Appl. No.: 870,347

[22] Filed: Jun. 5, 1997

[30] Foreign Application Priority Data

Jun. 20, 1996 [IT] Italy .................. PN96U0026

[51] Int. Cl.⁶ .............. A47J 27/00; A47J 37/00; A47J 37/12; F22C 11/04
[52] U.S. Cl. .............. 126/391; 99/330; 99/403; 99/408; 126/383
[58] Field of Search ............. 99/326, 330, 331, 99/336, 403–408, 410–418; 122/24; 126/390, 391, 383, 350 R, 41 R, 41 E, 353.5 A; 210/167, DIG. 8, 256, 257.1, 534, 540; 426/417, 419; 431/1

[56] References Cited

U.S. PATENT DOCUMENTS

| | | | |
|---|---|---|---|
| 2,535,905 | 12/1950 | Dawson | 99/408 |
| 4,580,549 | 4/1986 | Sato | 126/391 |
| 4,905,664 | 3/1990 | Dunham | 126/391 |
| 4,947,824 | 8/1990 | Ejiri et al. | 126/343.5 A |
| 4,989,580 | 2/1991 | Dunham | 126/41 R |
| 5,044,928 | 9/1991 | Yokoyama | 431/1 |
| 5,049,264 | 9/1991 | Rosnack et al. | 210/167 X |
| 5,179,891 | 1/1993 | Chiu | 99/408 |
| 5,261,322 | 11/1993 | Yokoyama et al. | 99/330 |
| 5,275,093 | 1/1994 | Chiu | 99/403 X |
| 5,452,648 | 9/1995 | Hohler et al. | 99/408 |
| 5,609,093 | 3/1997 | Hohler et al. | 99/330 X |
| 5,632,266 | 5/1997 | Sato | 126/391 |

FOREIGN PATENT DOCUMENTS 472 270   2/1992   European Pat. Off. .

*Primary Examiner*—Timothy F. Simone
*Attorney, Agent, or Firm*—Pearne, Gordon, McCoy & Granger LLP

[57] ABSTRACT

A deep fat fryer with submerged-pipe heating includes a frying vat containing a bath of oil or fat frying medium in which heating pipes exchanging heat with the frying medium are submerged. The heating pipes are heated up by respective flows of flue gases moving therethrough from one or more gas burners. The burners are powered fully or partially pre-mixed burners including a blower that takes in ambient air and, on the delivery side thereof, blows the air into a sealed container which is delimited on a side thereof by a perforated baffle whose perforations are concentrated in a plurality of pre-defined zones arranged substantially in front of the inlet openings of the pipes. Distinct flame torches on the outside of the perforations propagate at least partially into the respective inlet openings of the pipes.

6 Claims, 3 Drawing Sheets

FLOW TURBULENCE CREATING ARRANGEMENT OF A GAS-FIRED DEEP FAT FRYER

BACKGROUND OF THE INVENTION

The present invention relates to a deep fat fryer for frying food, which is adapted to heat up the frying oil by means of a heat-exchange process taking place between a plurality of heated pipes and a frying bath in which the same pipes are submerged.

Deep fat fryers for both household and commercial applications are known, in which the frying oil is heated up through the energization of one or several sheathed-type electric heating elements which are given an appropriate configuration, (i.e. shape) and are submerged in the frying medium. Such a solution, however, has three major drawbacks, the first one of which derives from the fact that the thermal inertia of such heating elements is rather high so that, although the temperature of the frying medium is controlled by thermostat, such heating elements are certainly not capable of ensuring an adequate, desired constancy of the temperature of the medium.

The second major drawback derives from the fact that, upon completion of the frying operation, said heating elements must themselves be removed from their operating position in order to be able to gain access to the bottom of the frying vat to the purpose of cleaning it by suitable removing the oil film and the frying debris therefrom. It is readily appreciated that this makes the construction of such heating elements much more complicated.

The third major drawback relates to the operating costs of such configurations, since the use of electric energy is generally the most expensive method to generate heat.

Deep fat fryers, in particular for commercial or mass catering applications, are also known which have their frying medium heated up by a plurality of metal pipes that are permanently submerged in the oil and are heated by hot flue gases flowing through them in a constant direction.

The flue gases are generated by and come from one or more atmospheric burners that are arranged close to the opening mouths of the pipes. Such flue gases from the burners are therefore caused to flow inside each one of said pipes all along the whole length thereof, and are then exhausted from the opposite end of the same pipes through an appropriate flue riser or exhaust system.

However, such a solution is negatively influenced by the fact that the heat output rate that can be ensured per surface unit of such pipes is rather modes, since the whole combustion process takes place at atmospheric pressure and is therefore conditioned by the draught of the flue exhaust system, which cannot be increased beyond well-defined limits that are mainly set by the size of the various component parts. Furthermore, due to the availability of modest heat output rates, it is quite difficult to ensure any reasonably acceptable (i.e. accurate) thermostatic control of the frying medium.

In addition to all that, another drawback has actually emerged in that the above mentioned pipes, as is well-known heat up to a much greater extent along their flue-gas inflow section than along their flue-gas outflow section, so that the frying medium is heated up in a corresponding non-uniform manner. This of course leads to a clear worsening of the overall frying results.

The European patent application no. 0 472 270 to FURI-GAS Limited, and well as the patent literature cited in the related search report, describe the construction of powered burners with a continuous flame bed in which the control of the combustion of the gas and, therefore, also the control of the noise generated by the flames can be obtained through a plurality of baffles that are appropriately arranged inside the body of the burner.

By using the pressure and the vorticity generated by the blowing means of a powered burner to the best possible advantage, it is possible for the gas/air mixture to be formed to its optimum ratio and the combustion of this mixture to occur in a regular manner, under resulting restrainment of the noise generation within some well-defined, limited torch zones, thereby limiting the utilization of baffles or similar means generally used to control and regulate flames.

The need therefore arises to provide a deep fat fryer, particularly of the type used in mass catering and similar applications, which overcomes the above cited drawbacks with a construction which however is simple, reliable and makes use of readily available techniques.

SUMMARY OF THE INVENTION

In this connection, it is a purpose of the present invention to provide a deep fat fryer which is heated by the flow of hot flue gases, with a plurality of heating pipes submerged in the frying medium and capable of providing a high specific heat output rate.

It is a further purpose of the present invention to ensure a significant improvement in the uniformity of the temperature distribution over the full length of the outer surface of said pipes.

Another purpose of the invention is to reach all such aims through the use of techniques and materials that are simple and readily available on the marketplace.

The present invention discloses a kind of deep fat fryer which has the characteristics and features as substantially recited in the appended claims and described with particular reference thereto.

BRIEF DESCRIPTION OF THE SEVERAL VIEWS OF THE DRAWING

The invention will be readily and clearly understood from the description that is given below by way of non-limiting example with reference to the accompanying drawings, in which.

DESCRIPTION OF THE INVENTION

Figure 1:
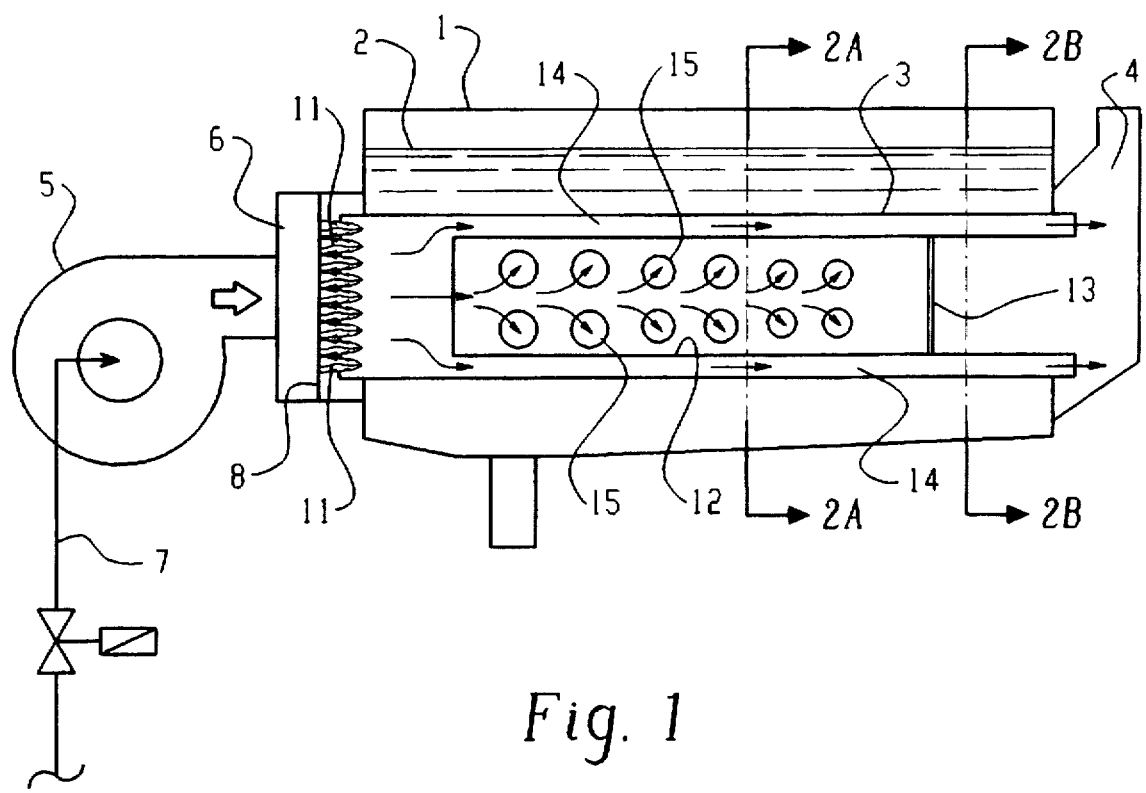
FIG. 1 is a schematically illustrated longitudinal, vertical-section view of a frying vat according to the present invention.
Figure 2:
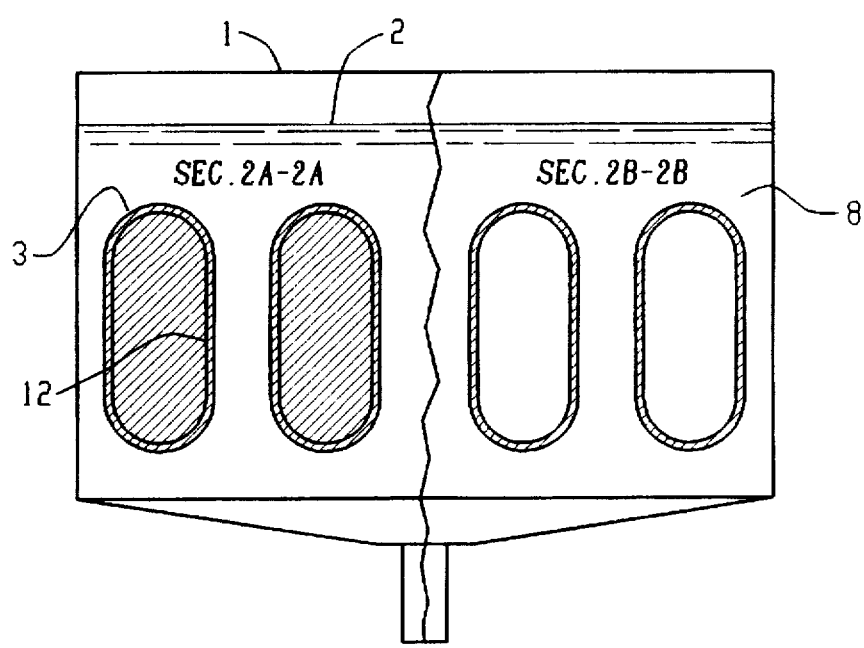
FIG. 2 is a view showing the two cross-sections A—A and B—B of the frying vat according to the present invention shown in FIG. 1.

Referring now to FIGS. 1 and 2, the basic structure of a deep fat fryer according to the present invention includes a vat 1, an oil bath or frying medium 2 contained in said vat, a heating pipe 3 submerged in said frying medium, and a flue exhaust system 4 for letting out the flue gases that flow through said heating pipe 3.

On the left side of the oil bath, a powered or blown-air burner includes a blowing means 5, a box-like shaped element 6 acting as a diffusion chamber for the gas/air mixture, and a conduit 7 supplying the gas into the volute of the impeller of the blowing means.

Figure 3:
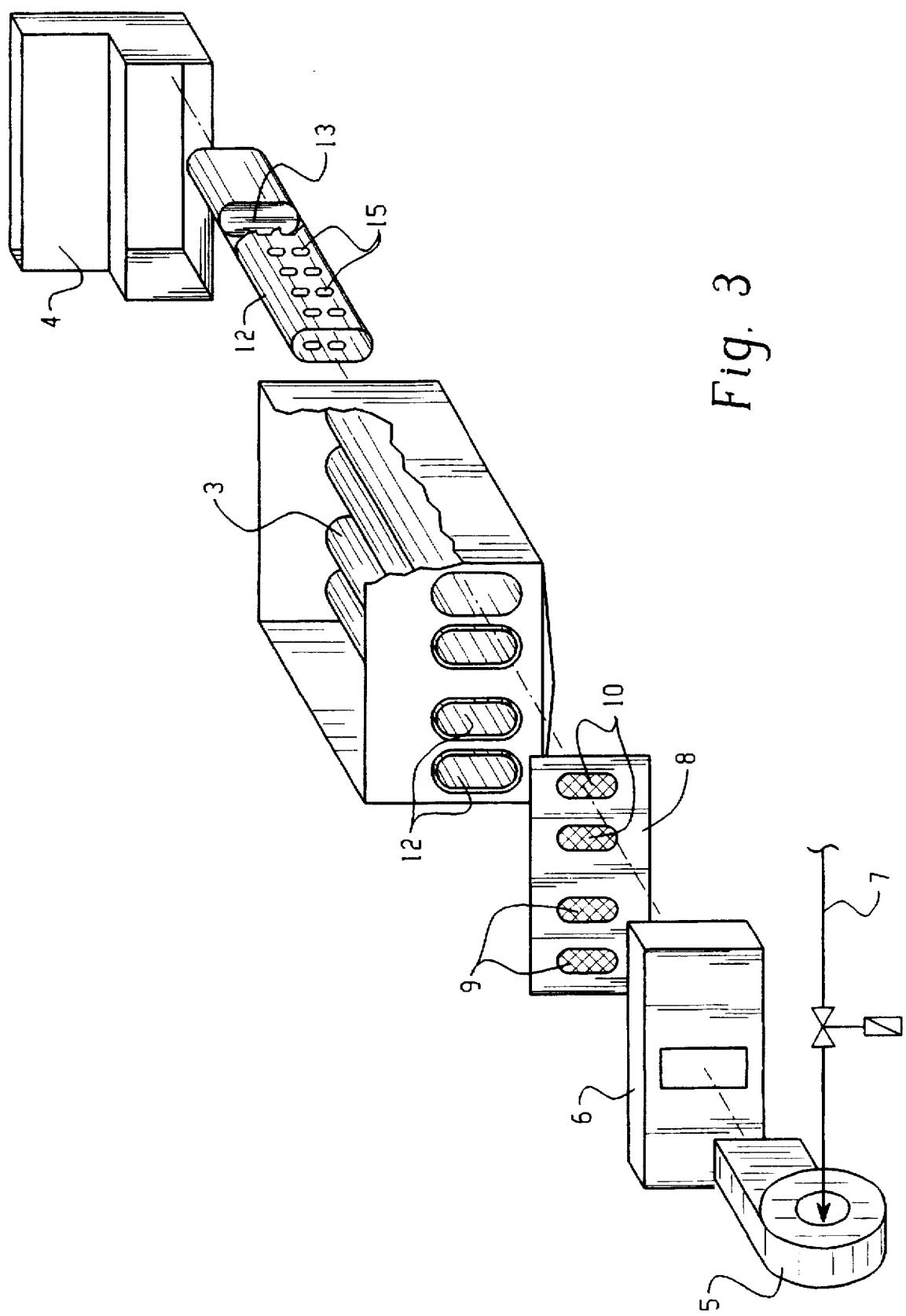
FIG. 3 is an exploded view of the various main component parts of a deep fat fryer according to the present invention.

Said box-like shaped element 6, which may contain elements adapted to improve the diffusion of the air flow, includes a wall extending towards the heating pipes. The wall defines a baffle 8 provided with a plurality of perforated zones 9, the outlet ports 10 of which (generally shown in the hatched zones of FIG. 3) form the final portion of the burner and are adapted to allow respective flame torches 11 to flow out therethrough in correspondence of the inflow mouths of the heating pipes 3, so that said torches are capable of flowing naturally into the respective heating pipes facing them.

It will therefor be readily appreciated that an appropriate arrangement of heating pipes suitable connected to said box-liked shaped element acting both as a burner and a mixer supplied by said blowing means, is fully capable of ensuring that each flame torch effectively and efficiently enters the respective pipe to an adequate depth, with the desired result that the heat output rate ensured by each single pipe is considerably increased for the same size and al other conditions.

No problem at all arises in connection with the gas from the supply conduit 7 mixing with the air taken in by the blowing means, either, since both media are gases that are easily mixed by the same vortex generated by the blowing means.

The high heat input transmitted, however, tends to distribute in a very irregular manner over the length of the heating pipes. The highest heat input will be available along the initial section of said pipes, in correspondence of the length of the flame torch, while, as it moves down towards the final section of the same pipes, the transmitted heat input tends to decrease due to the gases blown into the pipes gradually cooling down, said pipes giving off heat to such an extent as determined by the difference of temperature between the frying medium and the particular portion of pipe involved.

In order to therefore avoid such a drawback, which may also cause said heating pipes to incur overheating condition along their initial section creating a corresponding risk of the frying medium, burning out, an improvement is advantageously introduced, which substantially involves a particular conformation of said heating pipes.

With reference to FIGS. 1 through 4, these pipes are formed by a hollow substantially cylindrical or oval outer casing 3 and a hollow preferably coaxial and cylindrical or oval inner conduit terminating with closing means 13 arranged slightly before the gas outlet portion of the pipe 3.

In this way, an annular, substantially cylindrical or oval hollow space 14 is created between the two coaxial cylindrical or oval elements 3 and 12. Said inner conduit 12 is provided with a plurality of ports 15 distributed all over its surface, so that said hollow space created therebetween communicates with said inner conduit through said plurality of ports.

The effect and the operation mode of said arrangement are as follows: since the perforated zones 9 propagate respective flame torches 11 well into the corresponding heating pipes, each one of such flame torches splits up into two distinct portions, a more internal portion, or core portions, which enters said inner conduit 12, and a more external portion, or crown portion, which enters said hollow space 14.

The flow of flue gases through said hollow space cools down more rapidly than the flow of flue gases through the inner conduit, since it more readily transfers most of its heat contents to the frying medium through the wall of the pipe 3.

As the flow gradually progresses towards the flue outlet ports of the pipes, the velocity of the gas flow through the inner conduit decreases (until it drops near zero in correspondence of the closing wall 13), so that the relative pressure increases and, as a result, said inner air flow moves over into the annular hollow space 14 by passing through said ports 15.

From the regions near the ports 15 to the flue, the heat being transferred to the pipe, and from the pipe t the frying medium, comes almost solely from the portion of gases exhausted through said ports, since they are still very close to the temperature of the flame torch itself due to the fact that they have not yet transferred any appreciable portion of their heat contents.

Figure 4:
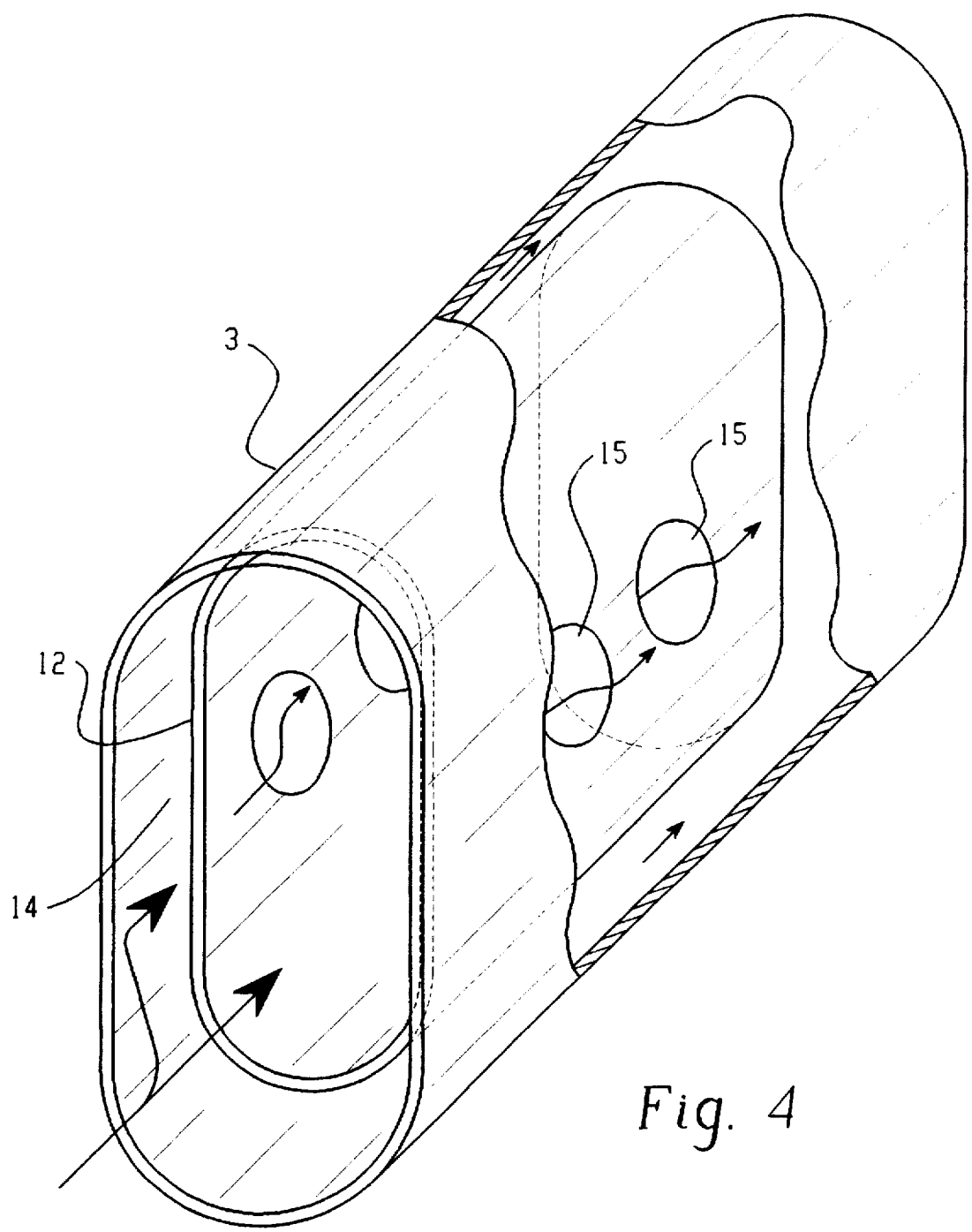
FIG. 4 is a detail view of an improvement of one of the pipes according to the present invention.

The operating principle of the present invention is that the heat of each flame torch is practically "divided " into two portions, one of which, i.e. the externa. one, transfers its heat contents along the first section of the pipe, while the other one is preserved in view of being "spent " along the remaining section of the pipe, as is best illustrated in FIG. 4.

A further improvement involves making said ports 15 so that they are progressively smaller towards the bottom of the conduit 12, as well as towards the closing wall 13, as is best shown in FIG. 1.

Such a feature is explained by the need for a flow of gas to be created inside the conduit towards the hollow space, so as to ensure that the temperature of the outer surface of the heating pipe 3 is as uniform as possible: it has therefore been observed that, in view of reaching such a result, said ports 15 must preferably be given progressively decreasing apertures, and this can also be explained by the fact that the pressure of the gas inside the inner conduit 12 increases progressively as the flow approaches the closing wall 13, where the same pressure practically reaches its highest value.

Therefore, if said ports would be given the same aperture area, i.e. would be sized in a constant manner, most of the gas portion contained in the inner conduit 12 would diffuse into the hollow space 14 in the final section of the pipe only, thereby unbalancing the distribution of the gases and, as a result, impairing the desired uniformity of the temperature distribution.

The particular shape of the inner conduit 12 is such as to enable it to optimally connect and fit together with the pipe 3 to the purpose of maximizing heat exchange by radiation, i.e. the heat-exchange process that is prevailing in the initial section of the pipe where the conduit 12 itself becomes red with heat, i.e. glows, due to the very high temperature of the flue gases coming into contact with it.

In the final section of the pipe, after the closing wall 13, the reduction in the cross-section areas of the flow paths inside the pipes 3 (see FIG. 2 wherein the flow paths are indicated by cross-hatching) due to the same closing wall 13, causes the flow velocity of the flue gases themselves to increase, which brings about an increase in the heat-exchange process by forced convection, which prevails in this zone due to the lowering of the temperature of the flue gases that have already given off a part of their heat contents.

It will be appreciated that further improvements in the configuration, as far as gas flow distribution, flow rate of the blowing means, size of pipes and all other elements affecting the final result are concerned, can be reached through systematic sequences of experiments that are fully within the ability of all those skilled in the art.

The deep fat fryer can further be provided with a number of other arrangements and devices which, for simplicity, are omitted. Although the present invention has been described by the example of a preferred embodiment thereof using a generally known terminology, it shall not be considered as being limited by this, since, based on the above described teachings, those skilled in the art are fully capable of identifying and making any of a number of possible modifications and variations in both shape and configuration without departing from the scope of the present invention.

What is claimed is:

1. A deep fat fryer with submerged-pipe heating comprising a frying vat (1) for containing a bath of oil or fat frying medium; a plurality of heating pipes (3) in the vat and submerged in the frying medium in a heat-exchange relationship with said frying medium; a gas burner arranged at one end of said pipes for creating flue gases moving through the pipes and heating the pipes; a flue riser or exhaust system (4) provided on another end of said pipes for exhausting said flue gases into the atmosphere, characterized in that said burner is a powered, at least partially pre-mixed burner comprising:

blowing means (5) that take in ambient air;

a sealed container (6) defined on a side of the blowing means facing said frying vat and receiving the ambient air delivered by the blowing means; and a perforated baffle (8) disposed between the container and the pipes, wherein perforations (10) are concentrated in a plurality of pre-defined zones (9), said pre-defined zones being substantially concentrated in front of the inlet openings of said pipes.

2. Deep fat fryer according to claim 1, characterized in that said perforations (10) are arranged so that distinct flame torches (11) propagate at least partially into respective inlet openings of said pipes.

3. Deep fat fryer according to claim 2, characterized in that a supply conduit (7) is arranged to deliver the gas to a volute of the blowing means so that an air-gas mixture is formed within the volute of the impeller of said blowing means.

4. Deep fat fryer according to any of the preceding claims, characterized in that said pipes each contain a respective turbulence creating element formed by an inner conduit (12) substantially coaxial with the respective pipe, so that a substantially annular hollow space (14) is created between the inner side of said pipes (3) and the outer sides of the respective turbulence-creating conduits (12).

5. Deep fat fryer according to claim 4, characterized in that said inner conduits (12) are closed by a respective baffle (13) arranged towards the end section thereof in the direction of flow of the flue gases, and that the conduits are provided with a plurality of ports (15) connecting the interior of said conduits with the respective hollow space therearound.

6. Deep fat fryer according to claim 4, characterized in that said ports (15) have an aperture whose area increases progressively as the location thereof approaches an inlet opening of the respective inner conduit (12).

* * * * *

UNITED STATES PATENT AND TRADEMARK OFFICE
CERTIFICATE OF CORRECTION

PATENT NO. : 5,746,195
DATED : May 5, 1998
INVENTOR(S) : Codazzi et al.

It is certified that error appears in the above-identified patent and that said Letters Patent is hereby corrected as shown below:

On the title page,

In Section [30] Foreign Application Priority Data, please delete "PN96U0026" and insert --PN960026 U--.

Signed and Sealed this

Twenty-ninth Day of September, 1998

Attest:

BRUCE LEHMAN

Attesting Officer

Commissioner of Patents and Trademarks